United States Patent [19]

Inagaki et al.

[11] Patent Number: 4,811,933

[45] Date of Patent: Mar. 14, 1989

[54] FLUID-FILLED BUSHING

[75] Inventors: Hiromi Inagaki; Kazuo Matsuura; Tetsuya Koike; Toshihiko Suenaga; Masaru Yorita; Masaki Izawa, all of Saitama, Japan

[73] Assignee: Honda Giken Kogyo Kabushiki Kaisha, Tokyo, Japan

[21] Appl. No.: 112,303

[22] Filed: Oct. 26, 1987

[30] Foreign Application Priority Data

Oct. 27, 1986 [JP] Japan .................................. 61-255059
Oct. 27, 1986 [JP] Japan .................................. 61-255060

[51] Int. Cl.⁴ .............................................. F16F 5/00
[52] U.S. Cl. .................................. 267/140.1; 248/562; 267/35; 267/140.5
[58] Field of Search .................. 267/140.1, 140.5, 151, 267/35; 188/322.16, 322.17, 322.18; 248/562, 636

[56] References Cited

U.S. PATENT DOCUMENTS

| | | | |
|---|---|---|---|
| 2,582,998 | 1/1952 | Lee | 267/140.1 |
| 4,632,372 | 12/1986 | Nakajima et al. | 267/140.1 |
| 4,687,188 | 8/1987 | Knurek et al. | 267/140.1 |

FOREIGN PATENT DOCUMENTS

| | | | |
|---|---|---|---|
| 3519016 | 12/1986 | Fed. Rep. of Germany | 267/140.1 |
| 0040841 | 5/1985 | Japan | 267/140.1 |
| 61-170736 | 10/1986 | Japan | |
| 2173880 | 10/1986 | United Kingdom | 267/140.1 |

Primary Examiner—Andres Kashnikow
Assistant Examiner—Mark T. Le
Attorney, Agent, or Firm—Armstrong, Nikaido, Marmelstein & Kubovcik

[57] ABSTRACT

A fluid-filled bushing comprises an outer tube, an inner tube disposed coaxially in the outer tube, a plurality of resilient members disposed between the outer and inner tubes and defining a fluid chamber therebetween, and a closure member disposed in the fluid chamber and having a base fitted in the outer tube and a support disposed around the inner tube and supporting the inner tube swingably and axially slidably, the closure member dividing the fluid chamber into a plurality of fluid chambers. The closure member has a valve mechanism for varying the rate of fluid communication between the divided fluid chambers. The resilient members include two substantially annular resilient partitions positioned coaxially and axially symmetrically with respect to the closure member positioned between the resilient partitions.

9 Claims, 3 Drawing Sheets

FLUID-FILLED BUSHING

BACKGROUND OF THE INVENTION

1. Field of the Invention:

The present invention relates to a fluid-filled bushing, and more particularly to a fluid-filled bushing for use in a joint, for example, between a radius rod and a vehicle frame of an automobile.

2. Description of the Relevant Art:

In some conventional automobiles, the automobile frame and a member which supports a rear wheel axle are connected by a radius rod through a rubber bushing for keeping the frame and the support member in a certain relative positional relationship. The spring constant (or rigidity) of the rubber bushing in the joint between the radius rod and the frame greatly affects the compliance of the automobile suspension.

Japanese Laid-Open Utility Model Publication No. 61-170736 published Oct. 23, 1986, filed by the assignee of the present application, discloses a fluid-filled bushing which can positively adjust the compliance of an automobile suspension to improve maneuvering stability of the automobile.

The earlier fluid-filled bushing comprises inner and outer tubes disposed coaxially with each other, and a rubber tube of large wall thickness interposed between the inner and outer tubes to join them. The rubber tube has an annular groove defined centrally in an outer peripheral surrface thereof fully therearound, the annular groove having a substantially channel-shaped cross section. The outer tube has a partition on its inner peripheral surface which is disposed centrally in the annular groove over its entire length to divides the space of the annular groove into two axially separated fluid chambers. The partition has an annular communication passage communicating with the fluid chambers and a hole defined radially inwardly and opening into the communication passage. A valve member is rotatably fitted in the hole in the partition for varying the cross-sectional area of the communication passage.

The outer tube is fixed to a vehicle frame whereas the inner tube is coupled to a radius rod. The valve member is actuated by a stepping motor or the like to vary the cross-sectional area of the communication passage through which a fluid flows for thereby controlling the compliance of the suspension.

In the above conventional fluid-filled bushing, however, the inner peripheral surface of the partition is held in sliding contact with the bottom of the groove of the rubber tube and is subject to large sliding resistance. Therefore, the range in which the suspension compliance is adjustable is narrow. Since the overall spring constant of the bushing cannot be determined unless the sliding resistance is taken into account, it has been tedius and time-consuming to design the bushing.

SUMMARY OF THE INVENTION

In view of the aforesaid problems, it is an object of the present invention to provide a fluid-filled bushing which reduces resistance produced when inner and outer bues are relatively displaced, which has an increased range for compliance adjustment, and which can easily be designed.

According to the present invention, a fluid-filled bushing comprises an outer tube, an inner tube disposed coaxially in the outer tube, a plurality of resilient members disposed between the outer and inner tubes and defining a fluid chamber therebetween, and a closure member disposed in the fluid chamber and having a base fitted in the outer tube and a support disposed around the inner tube and supporting the inner tube swingably and axially slidably, the closure member dividing the fluid chamber into a plurality of fluid chambers. The closure member has valve means for varying the rate of fluid communication between the divided fluid chambers. The resilient members include two substantially annular resilient partitions positioned coaxially and axially symmetrically with respect to the closure member positioned between the resilient partitions.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
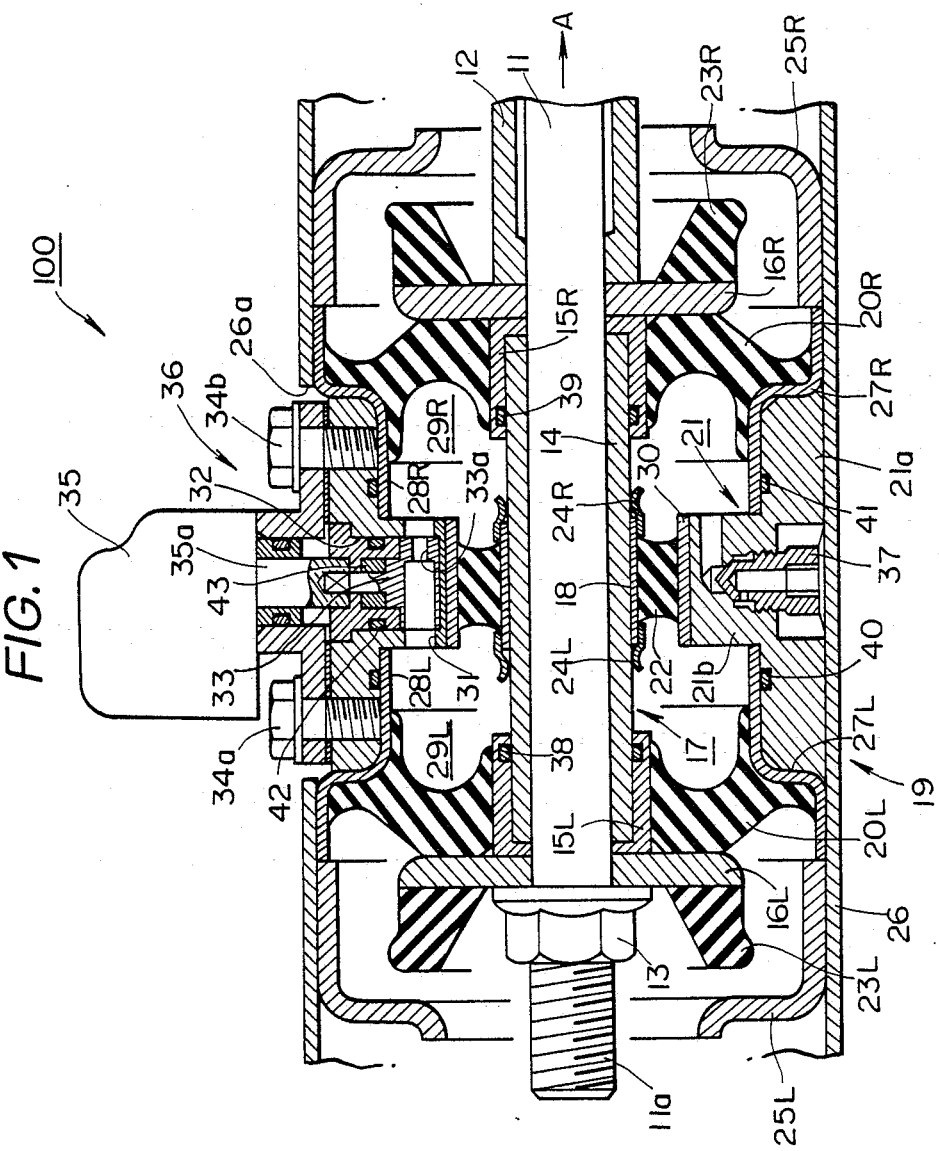
FIG. 1 is an axial cross-sectional view of a fluid-filled bushing according to an embodiment of the present invention.

A fluid-filled bushing, generally designated by the reference numeral 100 in FIG. 1, according to the present invention is particularly useful when employed to attach a radius rod to a frame of an automobile.

As shown in FIG. 1, the fluid-filled bushing 100 generally comprises an outer tube 19 fixed to the automobile frame (not shown), an inner tube 17 disposed coaxially in the outer tube 19 and supporting a front end portion of a radius rod 11 having a rear end portion coupled to an axle supporting member (not shown), the front end portion of the radius rod 11 being inserted in the inner tube 17, two resilient members 20L, 20R disposed between the outer and inner tubes 19, 17 and defining an inner space therebetween, and a clousure member 21 positioned between the outer and inner tubes 19, 17 and supporting the inner tube 17 swingably and axially slidably.

A positioning collar 12 is fitted over the radius rod 11 on a righthand (FIG. 1) portion thereof, and has an externally threaded lefthand end 11a on which a nut 13 is threaded. A main pipe 14 is fitted over the radius rod 11 in the inner tube 17 between the threaded end 11a and the collar 12. Holder pipes 15L, 15R are fitted respectively over the radius rod 11 near the opposite ends of the main pipe 14, and ring plates 16L, 16R are fitted over the radius rod 11 adjacent to the holder pipes 15L, 15R, respectively. The opposite ends of the main pipe 14 are fitted respectively in and retained by the holder pipes 15L, 15R. The ring plates 16L, 16R are held against the end surfaces of the holder pipes 15L, 15R, respectively, remotely from the main pipe 14. By fastening the nut 13 over the threaded end 11a of the radius rod 11, the main pipe 14 and the holder pipes 15L, 15R are securely positioned on the radius rod 11 between the collar 12 and the nut 13. The ring plates 16L, 16R serve as a stopper means for retaining the main pipe 14 and the holder pipes 15L, 15R in position on the radius rod 11. The inner pipe 17 are constructed of the main pipe 14, the holder pipes 15L, 15R, and the ring plates 16L, 16R. A bushing member (plain bearing) 18 is axially slidably fitted over a central portion of the main pipe 14.

To the ring plates 16L, 16R, rubber stoppers 23L, 23R are secured at surfaces thereof which face away from each other. The rubber stoppers 23L, 23R can be held against side tubes 25L, 25R, respectively, fitted in hte outer tube 19 for limiting the relative maximum axial displacement between the inner and outer tubes 17, 19.

The outer tube 19 comprises a main tube 26 fixed to the automobile frame, a pair of holder tubes 27L, 27R fitted in the main tube 26, and the side tubes 26L, 26R. The main tube 26 has a central upper opening 26a defined therein in radial alignment with the central portion of the main pipe 14. The holder tubes 27L, 27R and the side tubes 25L, 25R are positioned in the main tube 26 symmetrically with respect to the central radial axis of the opening 26a. The holder tubes 27L, 27R have smaller-diameter portions 28L, 28R extending toward the axis of the opening 26a, and a base 21a of a closure member 21 (described later) is fitted over the smaller-diameter portions 28L, 28R. The holder tubes 27L, 27R which hold the closure member 21 are axially sandwiched between the side tubes 25L, 25R engaging the axially opposite ends of the holder tubes 27L, 27R.

Between the holder tubes 27L, 27R and the holder pipes 15L, 15R, there are disposed two substantially annular resilient members 20L, 20R serving as resilient partitions having outer peripheral surfaces fixed in a fluid-tight manner to the inner peripheral surfaces of the holder tubes 27L, 27R and inner peripheral surfaces fixed in a fluid-tight manner to the outer peripheral surfaces of the holder pipes 15L, 15R. The resilient members 20L, 20R have intermediate portions lying between the inner and outer peripheral surfaces and bulging axially outwardly away from each other throughout the entire circumferential surfaces. The resilient members 20L, 20R interposed between the outer tube 19 and the inner tube 17 define an inner space or fluid chamber therebetween.

The closure member 21 is in the form of a substantially annular member having the base 21a fitted over the smaller-diameter portions 28L, 28R of the holder tubes 27L, 27R and a support extending radially inwardly from between the smaller-diameter portions 28L, 28R and dividing the inner space into two fluid chambers 29L, 29R. The support of the closure member 21 comprises an intermediate layer 21b extending radially inwardly from the base 21a, a collar layer 30, a resilient support layer 22, and the bushing member 18. The resilient support layer 22 is fixed to and disposed between the inner periphery of the collar layer 30 and the outer periphery of the bushing member 18. The bushing member 18 serves as slidably supporting means for supporting the main pipe 14 of the inner tube 17 for axially sliding movement. The resilient support layer 22 serves as swingably supporting means for supporting the bushing member 18 for swinging movement.

Figure 2:
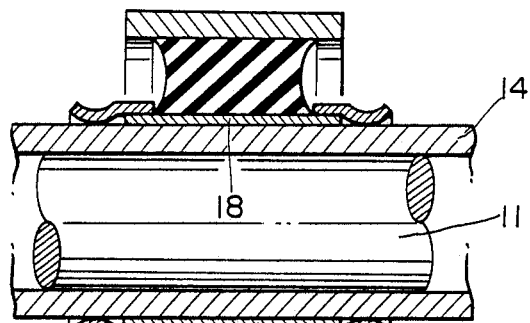
FIG. 2 is an enlarged fragmentary cross-sectional view of a closure member in the fluid-filled bushing shown in FIG. 1.

As shown in FIG. 2, lip seals 24L, 24R are fixed to the axially opposit ends of the bushing member 18 to provide a fluid-tight seal between the bushing member 18 and the main pipe 14.

The outer tube 19 including the closure member 21 supports the inner tube 17 swingably and axially movably with respect thereto through the resilient support layer 22 and the bushing member 18. The fluid chambers 29L, 29R, which is defined by the closure member 21 that centrally divides the inner space in which the resilient members 20L, 20R are disposed radially between the outer tube 19 and the inner tube 17, are filled with oil which is an uncompressible fluid. The rear surfaces of the resilient members 20L, 20R are held against the ring plates 16L, 16R, so that the resilient members 20L, 20R are prevented from excessively bulging in the axial direction.

The closure member 21 has a communication passage 31 defined axially through the intermediate layer 21b to provide fluid communication between the fluid chambers 29L, 29R, and a recess 32 defined radially in the outer peripheral surface of the base 21a within the opening 26a, the recess 32 opening into the communication passage 31. The recess 32 accommodates a rotary valve body 33 rotatably disposed therein and having a valve hole 33a which can open into the communication passage 31. The rotary valve body 33 is coupled to an output shaft 35a of an actuator 35 such as a stepping motor or the like fixed to the base 21a of the closure member 21 by means of bolts 34a, 34b. The rotary valve body 33 can thus be rotated by the actuator 35 for varying the rate of fluid communication through the communication passage 31, i.e., adjusting the cross-sectional area (opening) of the communication passage 31. The actuator 35 is coupled to a control unit (not shown) which controls the actuator 35 dependent on the automobile speed or the like. The actuator 35 and the rotary valve body 33 jointly constitute a valve mechanism 36.

A drain cock 37 serves to drain air when oil is filled in the fluid chambers 29L, 29R, the drain cock 37 being couled to an opening (not shown) defined in the main tube 26. Oil seals 38, 39 are disposed between the main pipe 14 and the holder pipes 15L, 15R. Oil seals 40, 41 are disposed between the closure member 21 and the holder tubes 27L, 27R. Oil seals 42, 43 are disposed around the rotary valve body 33.

Operation of the fluid-filled bushing is as follows:

When the radius rod 11 is axially displaced with respect to the automobile frame, i.e., when the inner and outer tubes 17, 19 are axially displaced with respect to each other, the main pipe 14 in the inner tube 17 is slid against the bushing member 18 to cause the volumes of the fliud chambers 29L, 29R to vary. Oil is therefore forced to flow between the fluid chambers 29L, 29R through the communication passage 31 to produce a damping force dependent on the opening of the communication passage 31 which is determined by by the valve mechanism 36.

More specifically, when the radius rod 11 is moved in the direction of the arrow A in FIG. 1, the resilient member 20L flexes to develop a pressure buildup in the fluid chamber 29L. At this time, the resilient support layer 22 of the closure member 21 is however displaced only a small distance under the pressure buildup since the spring constant of the resilient support layer 22 is high. Since the oil pressure is maintained by the lip seal 24L, oil flows from the fluid chamber 29L through the communication passage 31 into the fluid chamber 29R.

As the oil goes through the communication passage 31, it produces a high damping force which cannot be achieved by conventional rubber bushings. The radius rod 11 is swingable as well as axially movable. Since the bushing member 18 is supported on the resilient support layer 22, it allows such swinging movement of the radius rod 11 while holding the radius rod 11 axially slidably. The fluid chambers 29L, 29R may be disconnected from each other as independent fluid chambers by closing the communication passage 31 by the valve mechanism 36. When the communication passage 31 is closed, the damping effect is small, but a higher static spring constant can be attained by a fluid pressure buildup than the static spring constant of the resilient members 20L, 20R themselves.

The bushing member 18 and the main pipe 14 are kept fluid-tight therebetween by the lip seals 24L, 24R, and the resilient members 20L, 40R are prevented from being deformed by the ring plates 16L, 16R. Therefore, the volumes of the fluid chambers 29L, 29R are variable in proportion to axial displacement of the radius rod 11, so that the compliance characteristic of the fluid-filled bushing 100 is made dependent on the relative displacement between the inner tube 17 and the outer tube 19.

Since the bushing member 18 of the closure member 21 and the resilient support layer 22 can automatically be self-centered even when the radius rod 11 is swung, the bushing member 18 and the main pipe 14 of the inner tube 17 can slide smoothly with respect to each other.

Figure 4:
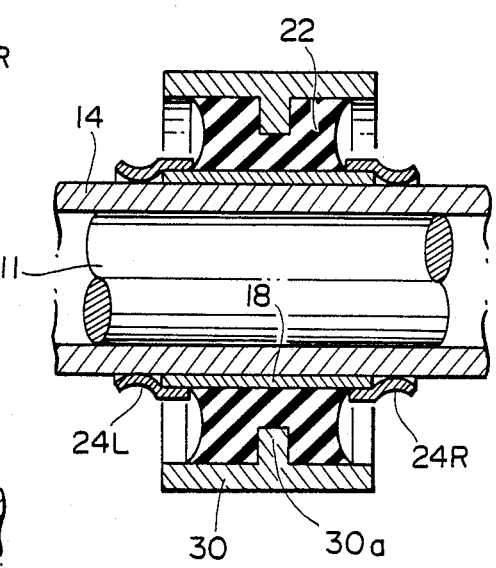
FIG. 4 is an enlarged fragmentary cross-sectonal view of a closure member according to a second modification.
Figure 3:
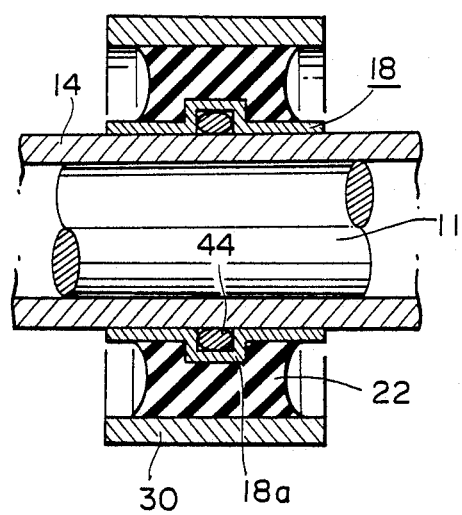
FIG. 3 is an enlarged fragmentary cross-sectional view of a closure member according to a first modification.
Figure 5:
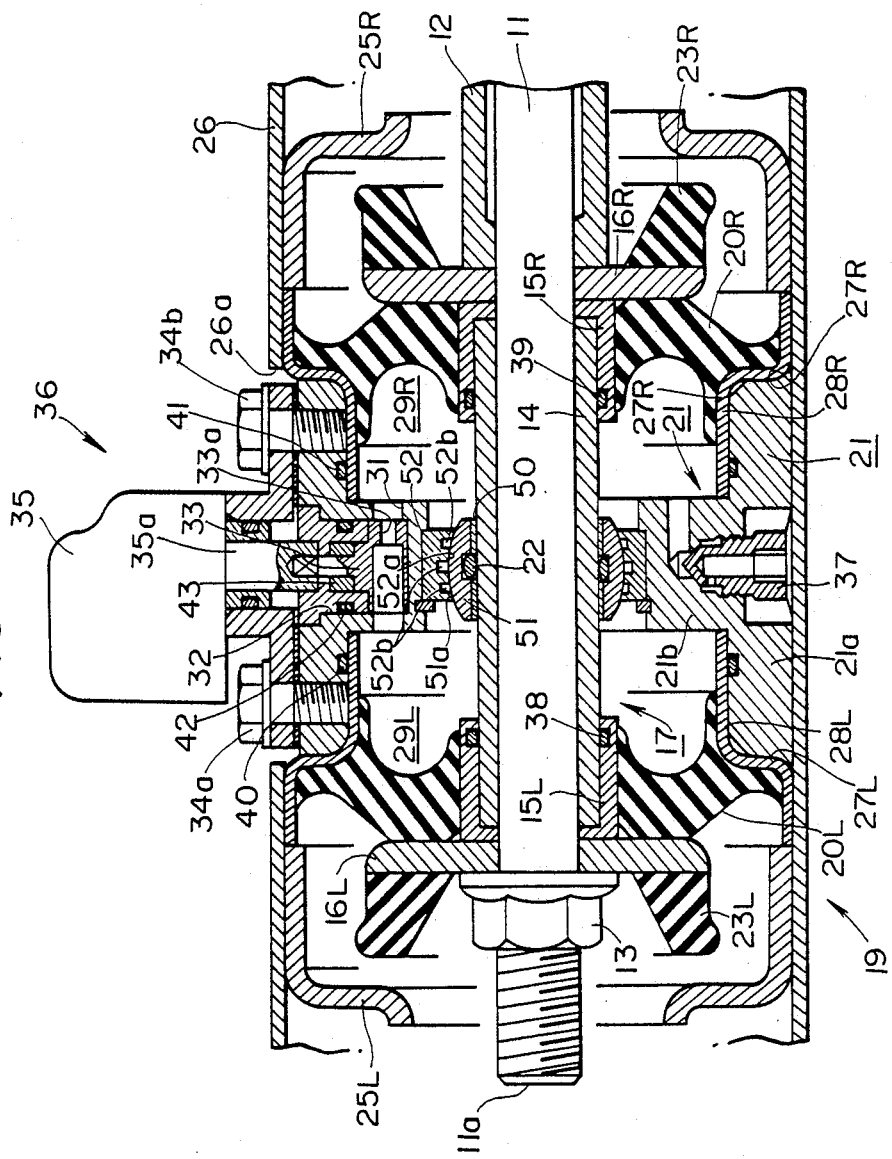
FIG. 5 is an axial cross-sectional view of a fluid-filled bushing having a closure member according to a third modification.

FIGS. 3, 4, and 5 show modified closure members according to the present invention. Those parts shown in FIGS. 3, 4, and 5 which are identical to those shown in FIGS. 1 and 2 are denoted by identical reference characters and will not be described in detail.

According to a first modification shown in FIG. 3, the bushing member 18 has a radially outward ridge 18a, and an oil seal or O-ring 44 is disposed against the inner periphery of the ridge 18a in sliding contact with the main pipe 14.

With the first modification, the resilient support layer 22 has an increased degree of rigidity, and hence has a spring constant which is lower against swinging movement of the radius rod 11 and higher against changes in the fluid pressure. Therefore, the volumes of the fluid chambers 29L, 29R can vary to a larger extent. Inasmuch as the oil seal 44 provides a fluid-tight seal between the fluid chambers 29L, 29R, the lip seals 24L, 24R shown in FIG. 2 are not required.

In a second modification illustrated in FIG. 4, the collar layer 30 of the closure member 21 has a radially inward ridge 30a. The ridge 30a increases the ridigity of the resilient support layer 22, so that the volumes of the fluid chambers 29L, 29R can vary to a larger extent.

FIG. 5 shows a third modification in which the closure member 21 includes a support comprising an inner bushing member 50 in which the main pipe 14 is axially slidably inserted, an intermediate bushing member 51 fitted over the inner bushing member 50 and having a partly spherical outer convex surface 51a, and an outer bushing member 52 having a partly spherical inner concave surface 52a held in sliding contact with the partly spherical outer convex surface 51a of the intermediate bushing member 51. The outer bushing member 52 has an outer peripheral surface atstached to the inner peripheral surface of the intermediate layer 21b of the closure member 21.

The inner concave surface 52a of the outer bushing member 52 has a plurality of elongate slots 52b for lubricating and keeping fluid-tight and mutually sliding surfaces 51a, 52a. The inner bushing member 50 supports a seal ring 50' for provding a fluid-tight seal between the inner bushing member 50 and the main pipe 14.

The third modification is as advantageous as the embodiment shown in FIGS. 1 and 2. More specifically, the inner bushing member 50, the intermediate bushing member 51, and the outer bushing member 52 allow the radius rod 11 to swing and move in the axial direction.

With the present invention, as described above, since the sliding resistance produced due to relative displacement of the inner and outer tubes is reduced, the range in which the spring constant (particularly the damping coefficient) of the fluid-filled bushing can be increased. Where the fluid-filled bushing of the invention is employed in a joint by which a radius rod is attached to an automobile frame, the compliance characteristic can be adjusted in an increased range. The fluid-fluid bushing can easily be designed as the effect of the sliding resistance on the spring constant can be neglected.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A fluid-filled bushing comprising:
    an outer tube;
    an inner tube disposed coaxially in said outer tube and including at least a main pipe supporting a radius rod coupled to an axle supporting member, said radius rod being inserted in said main pipe;
    two substantially annular resilient partitions coaxially disposed between said outer and inner tubes and defining a fluid chamber therebetween;
    a closure member disposed in said fluid chamber for dividing said fluid chamber into two fluid chambers and having a base fitted in said outer tube, first supporting means for axially slidably supporting said inner tube, second supporting means for supporting said first supporting means swingably from said base, and valve means for varying the rate of fluid communication between said divided fluid chambers;
    two stopper means fitted respectively over said radius rod near the opposite ends of said main pipe and having rubber stoppers; and
    two side tubes fitted in said outer tube with each side tube axially outward of one of said stopper means and engageable with the rubber stopper of said stopper means for limiting the relative maximum axial displacement between the inner and outer tubes.

2. A fluid-filled bushing according to claim 1, wherein said first supporting means includes an annular bushing member axially slidably fitted over said main pipe and an intermediate bushing member having an inner peripheral surface fitted over said annular bushing member and a convex outer peripheral surface, and said second supporting means includes an outer bushing member having a concave inner peripheral surface slidably fitted over said convex outer peripheral surface of said intermediate bushing member.

3. A fluid-filled bushing according to claim 2, wherein said concave inner peripheral surface of said outer bushing member has a plurality of elongate slots defined therein.

4. A fluid-filled bushing according to claim 1, wherein said slidably supporting means comprises a plain bearing bushing member slidably fitted over said main pipe, and said swingably supporting means comprises an annular resilient support member by which said plain bearing bushing member as swingably supported.

5. A fluid-filled bushing according to claim 4, wherein said plain bearing bushing member has a ridge disposed centrally on an outer peripheral surface thereof and extending fully circumferentially, said ridge projecting toward said resilient support member and accommodating an oil seal held slidably against said main pipe.

6. A fluid-filled bushing according to claim 4, wherein said second supporting means includes an annular collar having an inner peripheral surface supporting said annular resilient support member fixed thereto, said annular collar having a ridge projecting centrally from the inner peripheral surface thereof into said annular resilient support member.

7. A fluid-filled bushing according to claim 1, wherein said outer tube includes two holder tubes axially sandwiching said base of the closure member therebetween for retaining said base on an inner peripheral surface of said outer tube.

8. A fluid-filled bushing according to claim 7, wherein said annular resilient partitions are interposed between said holder pipes and said holder tubes.

9. A fluid-filled bushing according to claim 1, wherein said inner tube further includes two holder pipes fitted over said radius rod and respectively holding the opposite ends of said main pipe, each of said two stopper means being held against one of said holder pipes, and keeping said main pipe between said two stopper means.

* * * * *